US012771990B2

(12) United States Patent
Lee et al.

(10) Patent No.: US 12,771,990 B2
(45) Date of Patent: Oct. 20, 2026

(54) SOUND DEVICE

(71) Applicant: LG ELECTRONICS INC., Seoul (KR)

(72) Inventors: Giljae Lee, Seoul (KR); Yonghyuk Na, Seoul (KR); Hyunseung Yu, Seoul (KR); Jisung Ryu, Seoul (KR); Juchul Yun, Seoul (KR); Minhyuck Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 18/783,904

(22) Filed: Jul. 25, 2024

(65) Prior Publication Data

US 2025/0039598 A1 Jan. 30, 2025

(30) Foreign Application Priority Data

Jul. 26, 2023 (KR) ........................ 10-2023-0097634

(51) Int. Cl.

*H04R 1/28* (2006.01)
*H04R 1/04* (2006.01)
*H04R 1/08* (2006.01)
*H04R 7/16* (2006.01)

(52) U.S. Cl.

CPC ............. *H04R 1/2888* (2013.01); *H04R 1/04* (2013.01); *H04R 1/08* (2013.01); *H04R 1/288* (2013.01); *H04R 7/16* (2013.01); *H04R 2420/07* (2013.01); *H04R 2460/01* (2013.01); *H04R 2460/11* (2013.01)

(58) Field of Classification Search

CPC . H04R 1/04; H04R 1/08; H04R 1/288; H04R 1/1075; H04R 1/1083; H04R 2410/05; H04R 2460/11

See application file for complete search history.

(56) References Cited

U.S. PATENT DOCUMENTS

| | | | | |
|---|---|---|---|---|
| 9,792,893 B1 * | 10/2017 | Gauger, Jr. | .......... | H04R 1/1083 |
| 11,457,304 B1 * | 9/2022 | Nielsen | ................ | H04R 1/1091 |
| 2020/0090636 A1 | 3/2020 | Yang | | |
| 2020/0120411 A1 * | 4/2020 | Yu | ............................ | H04R 1/08 |
| 2022/0312124 A1 * | 9/2022 | Ko | ......................... | H04R 9/063 |

(Continued)

FOREIGN PATENT DOCUMENTS

| | | |
|---|---|---|
| KR | 10-2022-0101834 A | 7/2022 |
| KR | 10-2022-0134845 A | 10/2022 |
| KR | 10-2023-0072704 A | 5/2023 |

OTHER PUBLICATIONS

English Language Translation of KR 10-2023-0072704-A, pp. 1-11. (Year: 2023).*

*Primary Examiner* — Paul W Huber

(74) *Attorney, Agent, or Firm* — Birch, Stewart, Kolasch & Birch, LLP

(57) ABSTRACT

A sound device includes a transducer including a diaphragm; a nozzle spaced apart from the diaphragm; a holder positioned between the diaphragm and the nozzle, and coupled to the transducer; and a microphone coupled to the holder, and positioned inside the nozzle, wherein the holder may include: a bottom plate facing the diaphragm, and spaced apart from the diaphragm, the bottom plate having a hole facing the diaphragm; and a side wall extending along a rim of the bottom plate, and coupled to the transducer.

14 Claims, 16 Drawing Sheets

(56) References Cited

U.S. PATENT DOCUMENTS

| | | | | |
|---|---|---|---|---|
| 2023/0254628 A1* | 8/2023 | Kim | H04R 1/1016 | |
| | | | 381/74 | |
| 2023/0317049 A1* | 10/2023 | Liu | H04R 1/1083 | |
| | | | 381/71.2 | |

* cited by examiner

SOUND DEVICE

CROSS-REFERENCE TO RELATED APPLICATION

This application claims the priority benefit of Korean Patent Application No. 10-2023-0097634, filed on Jul. 26, 2023, the disclosure of which is incorporated herein by reference in its entirety.

BACKGROUND OF THE INVENTION

Field of the Invention

The present disclosure relates to a sound device.

Description of the Related Art

Earphones are a sound device (or an electronic device) that can be inserted into user's ears to personally listen to sounds such as music. Earphones may be a wired earphone that receives input signals through a cable or a wireless earphone that receives input signals through wireless communication.

The wireless earphone, which is equipped with a microphone function or provided with a button for relatively simple operations such as volume control, is being released. In addition, the wireless earphone is equipped with a battery that provides power for the operation of earphone. A wireless earphone case may be provided to charge the battery.

Recently, much research has been conducted on earphones equipped with an Active Noise Cancellation (ANC) function that reduces or blocks surrounding noise.

SUMMARY OF THE INVENTION

It is an objective of the present disclosure to solve the above and other problems.

Another objective of the present disclosure may be to provide a sound device having improved acoustic performance.

Another objective of the present disclosure may be to provide a sound device having minimal variation in sound quality.

Another objective of the present disclosure may be to provide a sound device having improved sound quality in a high frequency band.

Another objective of the present disclosure may be to provide a sound device equipped with an active noise cancellation function.

Another objective of the present disclosure may be to provide a sound device having a simplified noise inflow path (or air duct path) structure.

Another objective of the present disclosure may be to provide a sound device having improved assembly convenience and minimized process defects.

In accordance with an aspect of the present invention for achieving the above and other objectives, a sound device may include: a transducer including a diaphragm; a nozzle spaced apart from the diaphragm; a holder positioned between the diaphragm and the nozzle, and coupled to the transducer; and a microphone coupled to the holder, and positioned inside the nozzle, wherein the holder may include: a bottom plate facing the diaphragm, and spaced apart from the diaphragm, the bottom plate having a hole facing the diaphragm; and a side wall extending along a rim of the bottom plate, and coupled to the transducer.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

Figure 1:
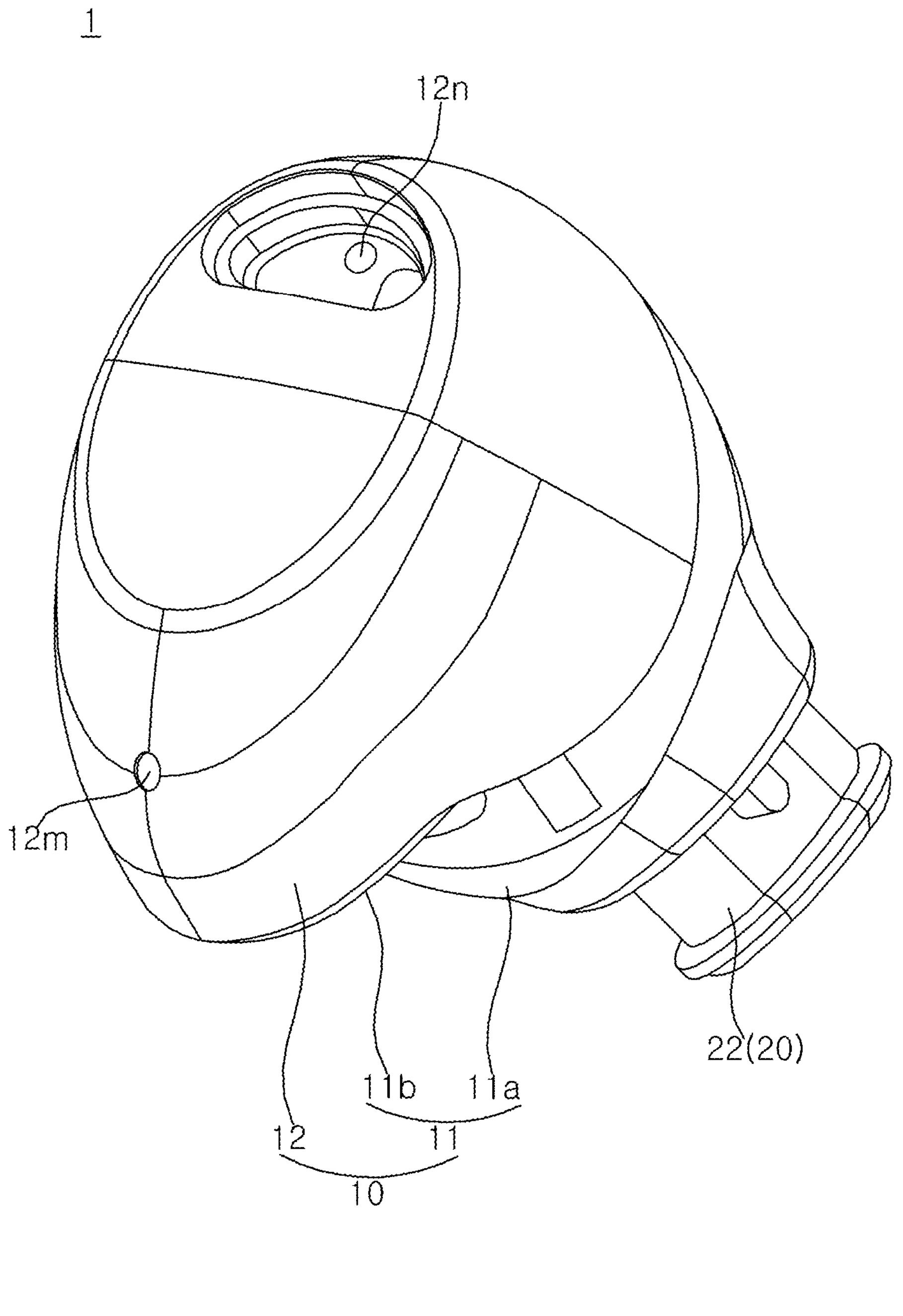
FIGS. 1 to 16 are diagrams illustrating examples of a sound device according to embodiments of the present disclosure.
Figure 2:
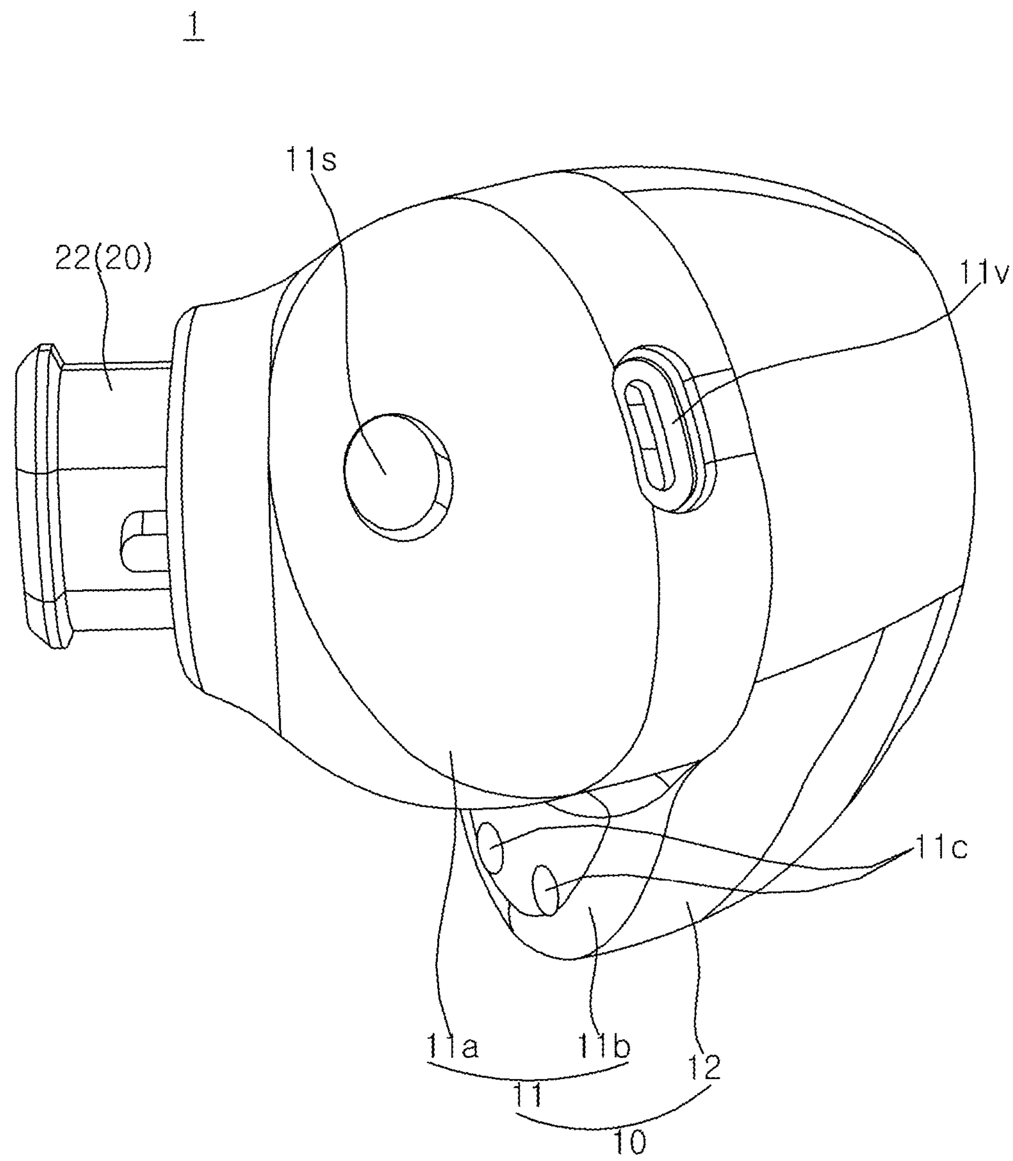

Referring to FIGS. 1 and 2, a sound device 1 may be worn on a user's ear and may play sound. For example, the sound device 1 in FIGS. 1 and 2 may be worn on the user's right ear, and a sound device that is left-right symmetrical to the sound device 1 may be worn on the user's left ear. The sound device 1 may be referred to as a wearable device 1, an earbud 1, or an earphone 1. The sound device 1 may include a housing 10 and a nozzle 20.

The housing 10 may include a bottom cover 11 and a top cover 12. The bottom cover 11 may face a user's ear canal and include a first part 11*a* and a second part 11*b*. The first part 11*a* may have a thimble shape as a whole, and the diameter of the first part 11*a* may become smaller as it approaches the user's ear canal. The second part 11*b* may extend from the edge of the first part 11*a* in a direction intersecting the first part 11*a*, and may have a guitar pick shape as a whole. The top cover 12 may be opposite the bottom cover 11, and one side of the top cover 12 may be coupled to the first part 11*a* and the second part 11*b* of the bottom cover 11. The top cover 12 may have a mask shape as a whole, and the diameter of the top cover 12 may become smaller as it moves away from the user's ear canal.

The nozzle 20 may protrude from the distal end of the first part 11*a* of the bottom cover 11, and may be inserted into the user's ear canal. The nozzle 20 has a hollow cylinder shape as a whole, and the diameter of the nozzle 20 may be smaller than the diameter of the distal end of the first part 11*a*. Meanwhile, an ear tip made of a material such as silicone, urethane, or rubber may be inserted into the distal end of the nozzle 20.

The sensor 11*s* may be mounted on the first part 11*a* of the bottom cover 11, and may detect whether the sound device 1 is worn on a user's ear canal. For example, the sensor 11*s* may be an IR sensor that uses light in an infrared wavelength range.

A charging terminal 11*c* may be mounted on the second part 11*b* of the bottom cover 11, and may transmit external power to the battery built into the sound device 1. For example, when the sound device 1 is stored in a case (not shown) of the sound device, the charging terminal 11*c* of the sound device 1 may be electrically connected to the charging terminal of the case, and as a result, the battery built into the sound device 1 may be charged. The battery may be mounted between an inner bracket 13 and a substrate 14 which will be described later with reference to FIG. 3.

A call microphone 12*m* may be mounted on the top cover 12, and a user may input voice through the call microphone 12*m*.

Figure 3:
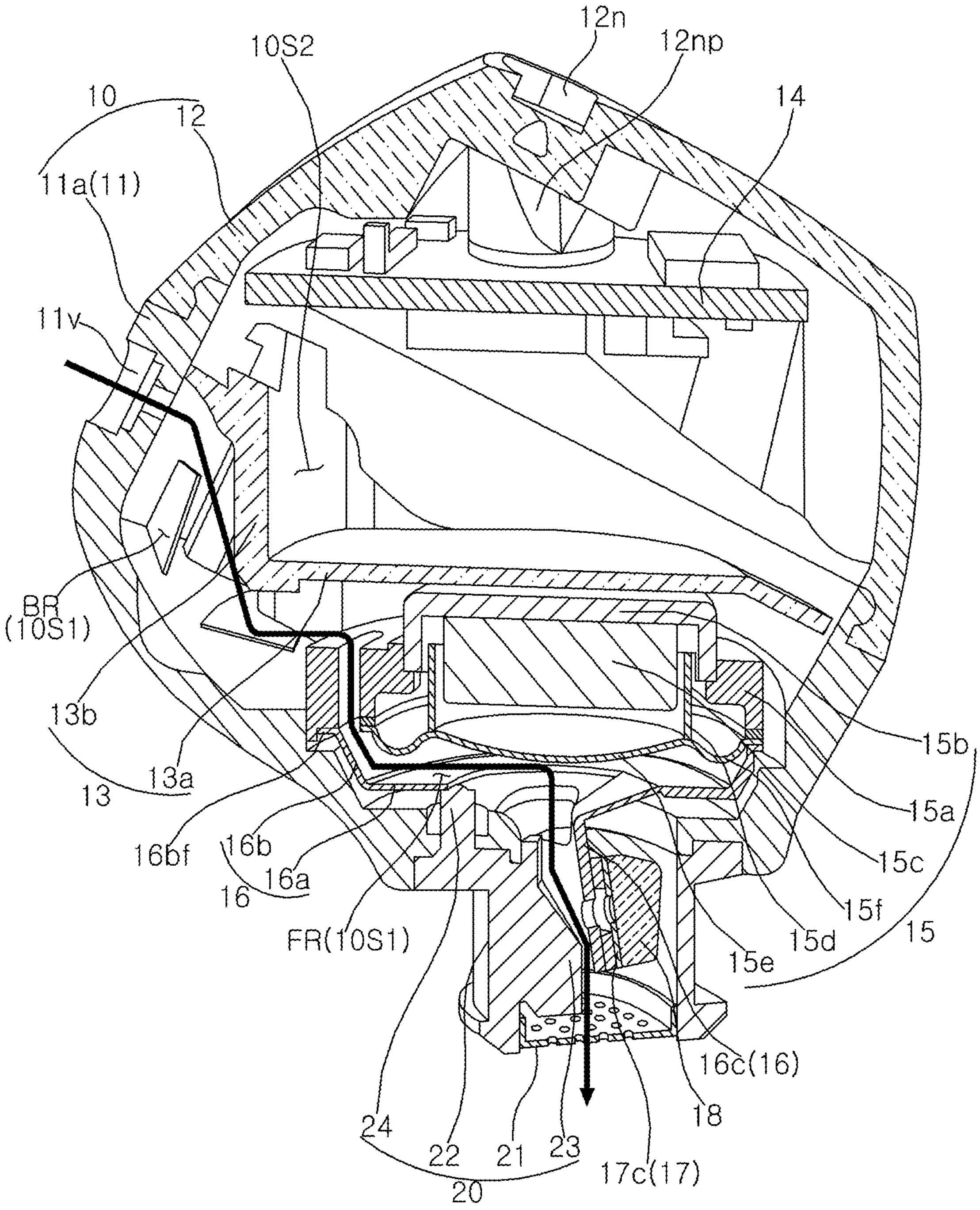

Referring to FIG. 3, the inner bracket 13 may be coupled to the inner surface of the housing 10 while being adjacent to the boundary between the first part 11*a* of the bottom cover 11 and the top cover 12. The inner bracket 13 may include a seating portion 13*a* and a coupling portion 13*b*. The inner bracket 13 may divide the inner space of the housing 10 into two spaces 10S1 and 10S2. A first space 10S1 may be located between the inner bracket 13 and the nozzle 20, and a second space 10S2 may be opposite to the first space 10S1 with respect to the inner bracket 13.

A transducer 15 may be located in the first space S1 and may be mounted on the seating portion 13*a* of the inner bracket 13. The transducer 15 may be referred to as a speaker 15. The transducer 15 may include a frame 15*a*, a plate 15*b*, a magnet 15*c*, a bobbin 15*d*, a diaphragm (trembler) 15*e*, and an edge 15*f*.

The frame 15*a* may have a ring shape as a whole and support the remaining components of the transducer 15. The plate 15*b* may be coupled to the frame 15*a* at between the frame 15*a* and the seating portion 13*a* of the inner bracket 13, and may be supported by the seating portion 13*a*. The plate 15*b* may have a round tray shape as a whole. The magnet 15*c* may be opposite to the seating portion 13*a* of the inner bracket 13 with respect to the plate 15*b*, and may be coupled to the plate 15*b*. The magnet 15*c* may have a cylindrical shape as a whole. The bobbin 15*d* may be located between the rim of the magnet 15*c* and the plate 15*b*, and may extend along the rim of the magnet 15*c*. A voice coil may be formed or wound on the outer circumferential surface of the bobbin 15*d*. One side of the diaphragm 15*e* may be coupled or attached to the bobbin 15*d*, and the other side of the diaphragm 15*e* may be supported by the elastic edge 15*f*. The diaphragm 15*e* may have an overall dome shape that is convex toward the nozzle 20, and the edge 15*f* may have a ring shape to connect the rim of the diaphragm 15*e* and the frame 15*a*.

Accordingly, when current flows in the voice coil of the bobbin 15*d* located around the magnet 15*c*, the bobbin 15*d* and the diaphragm 15*e* may vibrate in the longitudinal direction of the bobbin 15*d* due to Lorentz force, and the transducer 15 may output sound.

Figure 4:
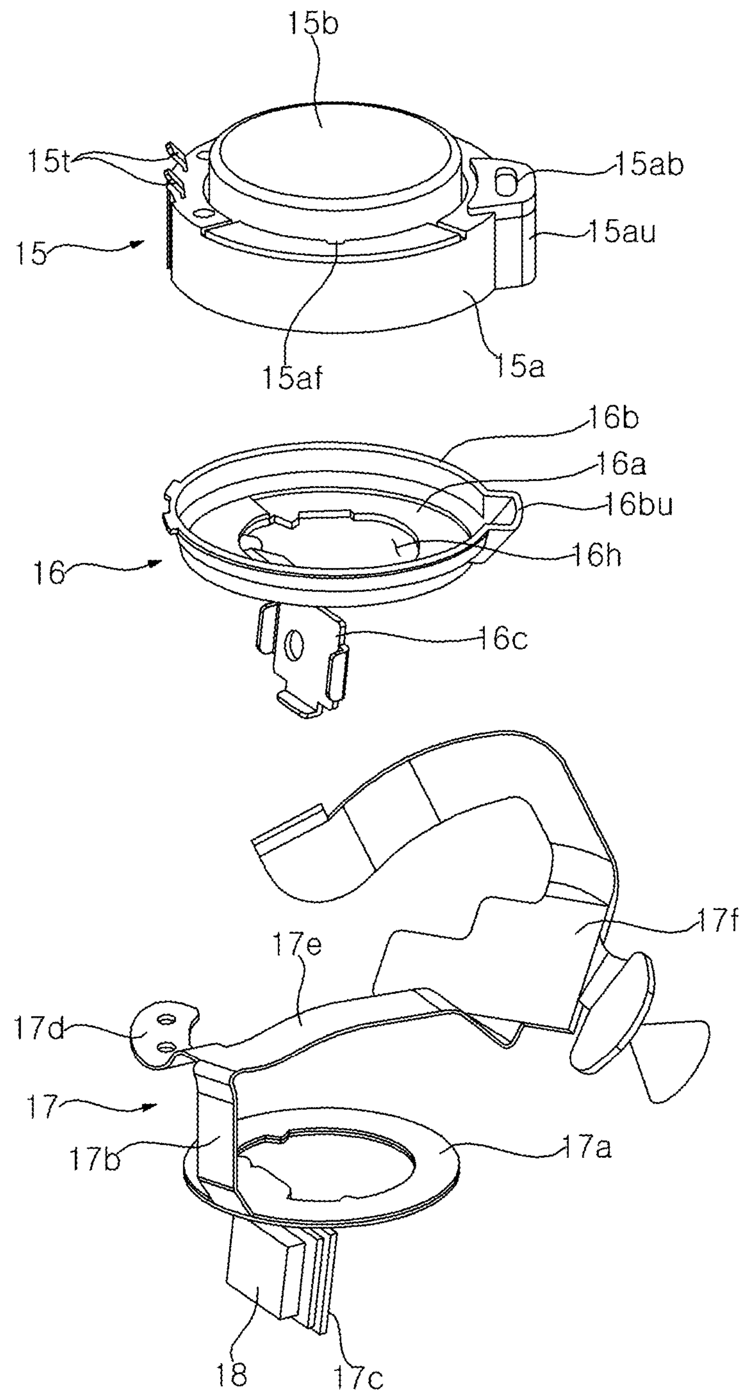

Referring to FIGS. 3 and 4, a holder 16 may be located between the transducer 15 and the nozzle 20, and a circuit board 17 may surround the holder 16 and the transducer 15. The holder 16 may be referred to as a microphone holder 16. The circuit board 17 may be a Flexible Printed Circuit Board (FPCB) 17.

The holder 16 may include a bottom plate 16*a*, a side wall 16*b*, and a supporter 16*c*. The bottom plate 16*a* may have an overall disk shape, and may face the diaphragm 15*e* of the transducer 15 and the edge 16*f*. The sidewall 16*b* may protrude from the rim of the bottom plate 16*a* toward the transducer 15, and may extend along the rim of the bottom plate 16*a*. The bottom plate 16*a* and the sidewall 16*b* may have an overall round tray shape. The supporter 16*c* may protrude from the bottom plate 16*a* toward the nozzle 20, and may be located in the interior of the nozzle 20.

The circuit board 17 may include a first part 17*a*, a second part 17*b*, a third part 17*c*, a fourth part 17*d*, a fifth part 17*e*, and a sixth part 17*f*. The first part 17*a* may have an overall ring shape. The second part 17*b* may protrude from the outer periphery of the first part 17*a* in a direction intersecting the first part 17*a*. The third part 17*c* may protrude from the inner periphery of the first part 17*a* in a direction intersecting the first part 17*a*, and may be opposite the second part 17*b*. The fourth part 17*d* and the fifth part 17*e* may branch from the second part 17*b*, and the sixth part 17*f* may extend from the fifth part 17*e*.

A mic 18 may be mounted on the third part 17*c* of the circuit board 17, and may be electrically connected to the circuit board 17. The mic 18 may be a feedback microphone. The mic 18 may be referred to as a mic 18.

Figure 5:
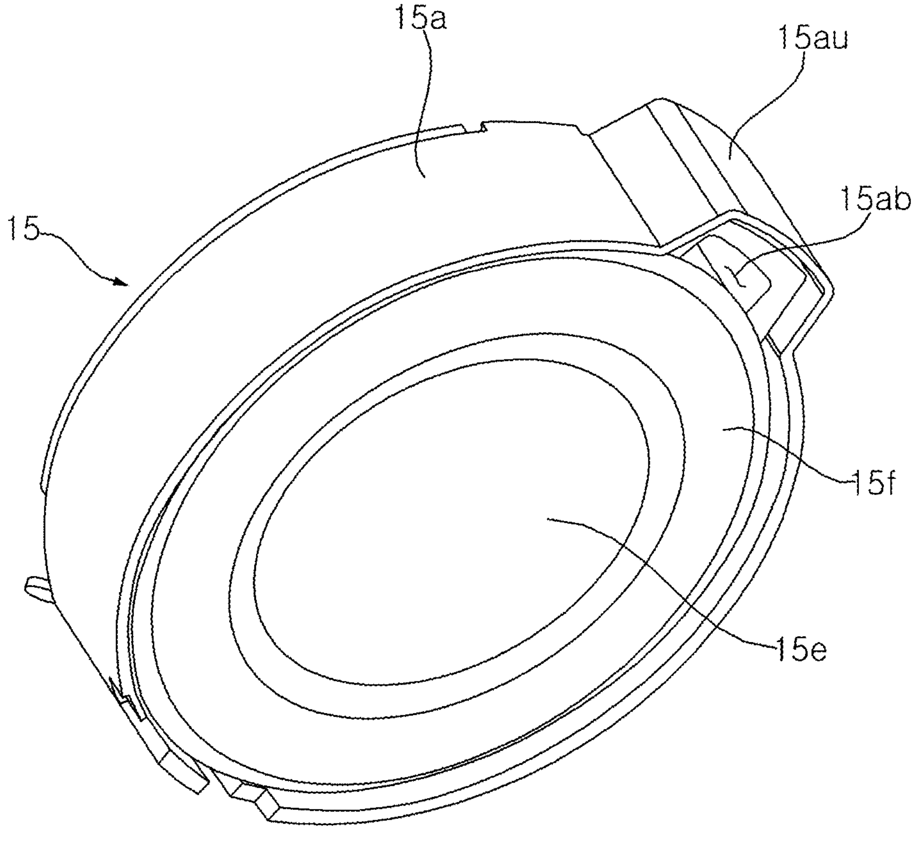
Figure 6:
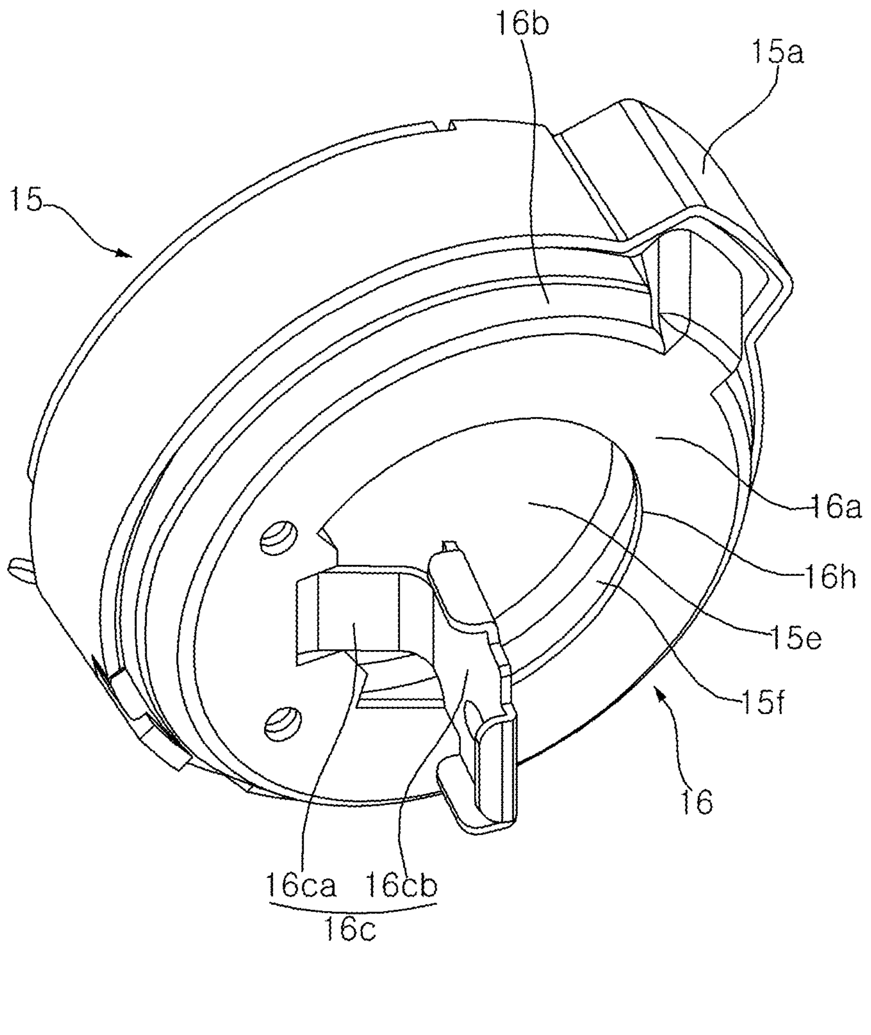

Referring to FIGS. 5 and 6, the holder 16 may be coupled to the transducer 15 below the transducer 15. Specifically, the distal end 16*bf* of the side wall 16*b* of the holder 16 may be detachably inserted and fixed to the frame 15*a* of the transducer 15 (see FIG. 3). In this case, the bottom plate 16*a* of the holder 16 faces the diaphragm 15*e* of the transducer 15 and the edge 15*f*, but may be spaced apart from them.

The hole 16*h* may be formed to penetrate the central portion of the bottom plate 16*a* of the holder 16, and may face the diaphragm 15*e*. The hole 16*h* may be located between the diaphragm 15*e* and an internal space of the nozzle 20. The hole 16*h* may be aligned with the diaphragm 15*e* or may be slightly offset from the diaphragm 15*e*. A space between the transducer 15 and the holder 16 may communicate with the outside through the hole 16*h*. Here, the side wall 16*b* of the holder 16 may define part of the boundary of the space between the transducer 15 and the holder 16. A portion of the bottom plate 16*a* in which the hole 16*h* is not formed may cover the edge 15*f* of the transducer 15, and the hole 16*h* may be located in response to the diaphragm 15*e*.

The supporter 16*c* of the holder 16 may include a bent portion 16*ca* and a support portion 16*cb*. The bent portion 16*ca* may be bent from a portion of the bottom plate 16*a* that defines the boundary of the hole 16*h*, and the support portion 16*cb* may be formed in a distal end of the bent portion 16*ca*.

The support portion 16*cb* may be a plate-shaped member that intersects the bottom plate 16*a*. A plurality of ribs (no reference numeral) may be formed in the rim of the support portion 16*cb*. For example, the supporter 16*c* may be formed by cutting and bending a portion of the bottom plate 16*a*. Alternatively, a portion of the supporter 16*c* (i.e., a portion of the bent portion 16*ca*) may be coupled to the bottom plate 16*a* at between the bottom plate 16*a* and the transducer 15 (see FIG. 13).

Figure 7:
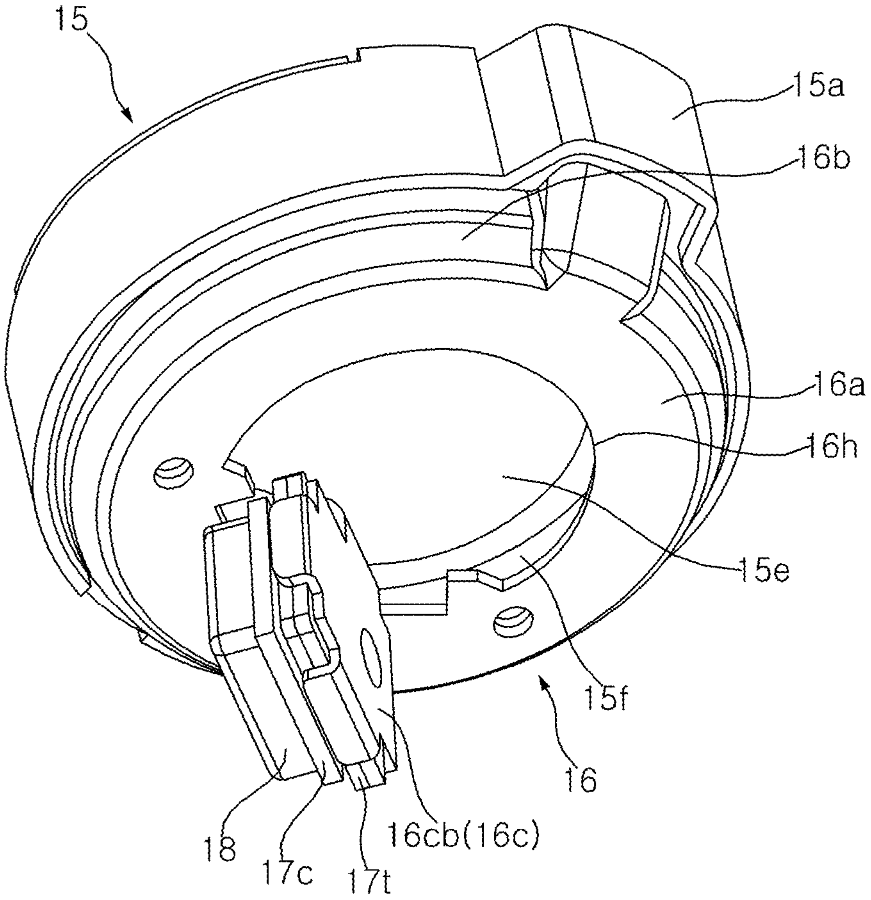
Figure 8:
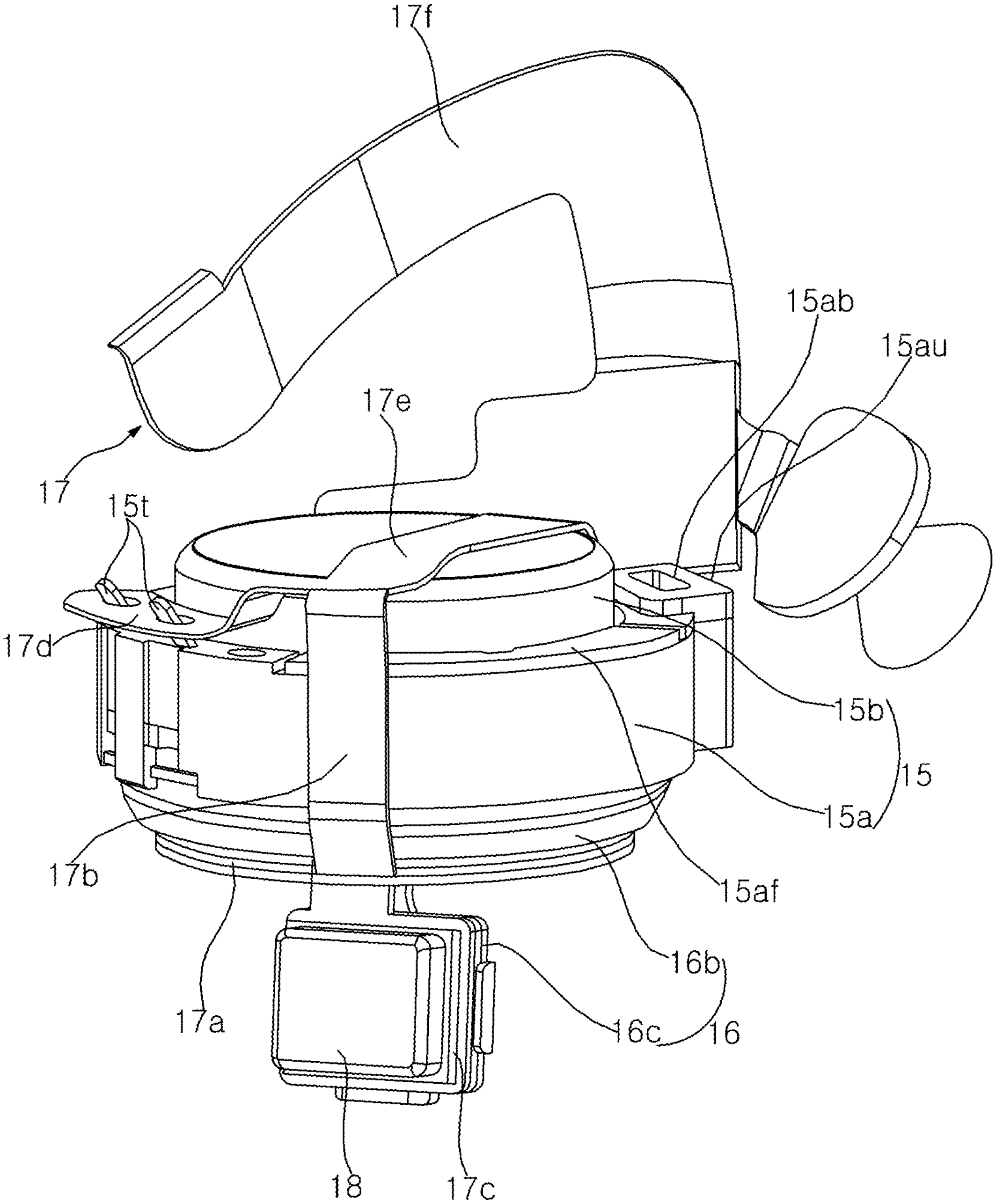

Referring to FIGS. 7 and 8, the mic 18 may be mounted on one surface of the third part 17*c* of the circuit board 17. The other surface of the third part 17*c*, which is opposite to the one surface, may be coupled to the support portion 16*cb* of the supporter 16*c* through an adhesive member 17*t* such as a tape. The ribs of the support portion 16*cb* may guide the coupling of the third part 17*c* with the support portion 16*cb*. The third part 17*c* may be referred to as a mounting portion 17*c*.

In this case, the first part 17*a* of the circuit board 17 may surround the side surface of the sidewall 16*b* of the holder 16, and the second part 17*b* may be located on the side surface of the frame 15*a* of the transducer 15. The fourth part 17*d* may be penetrated by a protrusion 15*t* formed in one surface of the frame 15*a*, and may be coupled to the frame 15*a*. The fifth part 17*e* may be located on the plate 15*b* of the transducer 15, and the sixth part 17*f* may extend from the fifth part 17*e*, and may be electrically coupled to electronic components embedded in the body 10 (see FIG. 3).

Accordingly, the transducer 15, the holder 16, the circuit board 17, and the mic 18 may be assembled into one assembly or module.

Figure 9:
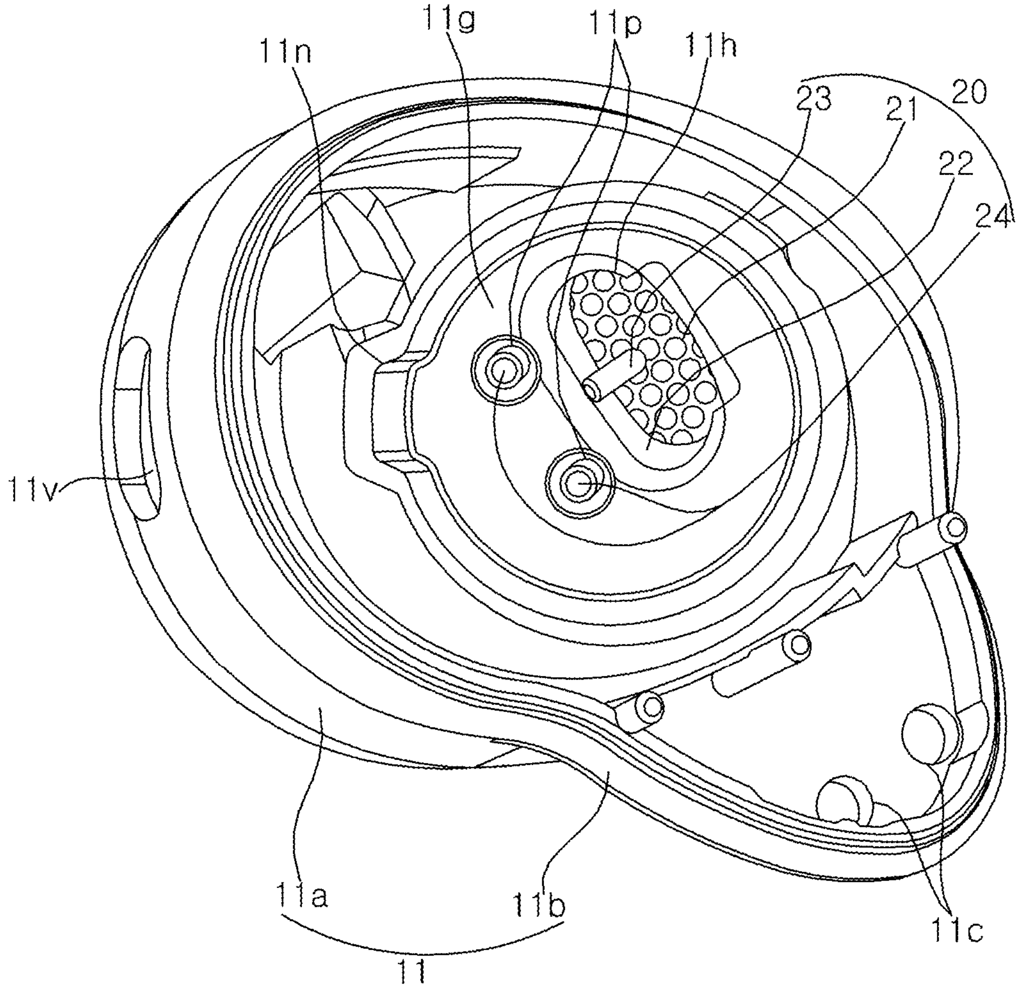

Referring to FIG. 9, the nozzle 20 may include a nozzle plate 21, a nozzle wall 22, a support rib 23, and a fixing pin 24.

The nozzle plate 21 may be a flat plate forming the distal end of the nozzle 20, and a plurality of holes may be formed in the nozzle plate 21. The holes of the nozzle plate 21 may be referred to as speaker holes. The nozzle plate 21 may be spaced apart from the distal end of the first part 11*a* of the bottom cover 11 (see FIG. 3), and the nozzle wall 22 may connect the rim of the nozzle plate 21 and the first part 11*a*. The nozzle wall 22 may have a hollow cylinder shape, and the nozzle plate 21 may be inserted into the distal end of the nozzle wall 22. The support rib 23 may be formed on the inner surface of the nozzle wall 22. The fixing pin 24 may protrude from the nozzle wall 22 toward the first part 11*a*, and may be inserted into the first part 11*a*.

For example, the fixing pin 24 may be ultrasonically fused to the first part 11*a*, and thus the nozzle 20 may be coupled to the bottom cover 11. In this case, a connection portion between the nozzle 20 and the bottom cover 11 may be formed smoothly (simply), compared to a case where the nozzle 20 is hook-coupled to the bottom cover 11. Accordingly, the sound of the transducer 15 may be smoothly guided from the first part 11*a* to the nozzle 20.

Figure 10:
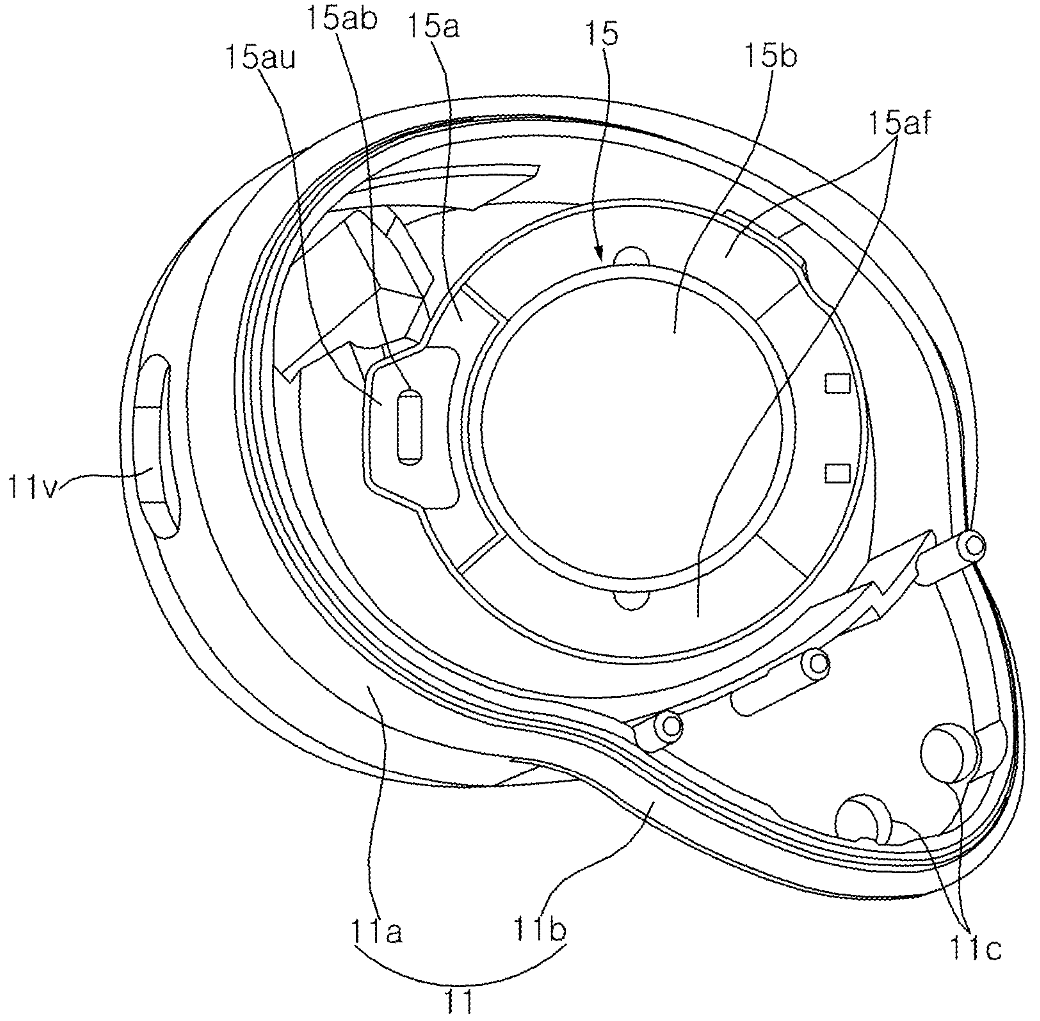

Referring to FIGS. 9 and 10, a recessed portion 11*g* may be formed on the inner surface of the first part 11*a* of the bottom cover 11. A housing hole 11*h* may be formed to penetrate the recessed portion 11*g*, and may face the nozzle plate 21 of the nozzle 20. That is, the inner space of the bottom cover 11 may be in communication with the inner space of the nozzle 20 through the housing hole 11*h*. The aforementioned fixing pin 24 of the nozzle 20 may be inserted into the hole 11*p* formed in the recessed portion 11*g*. A guide groove 11*n* may be formed on the side wall of the recessed portion 11*g*, and may have a notch shape.

The transducer 15 and the bottom plate 16*a* of the modularized holder 16 may be seated on the recessed portion 11*g* having a shape corresponding to the bottom plate 16*a*. A guide protrusion 15*au* may protrude radially from the side surface of the frame 15*a* of the transducer 15, and may be inserted into the guide groove 11*n*. That is, the guide protrusion 15*au* and the guide groove 11*n* may guide the coupling of the module of the transducer 15 and the holder 16 with and the bottom cover 11.

Figure 11:
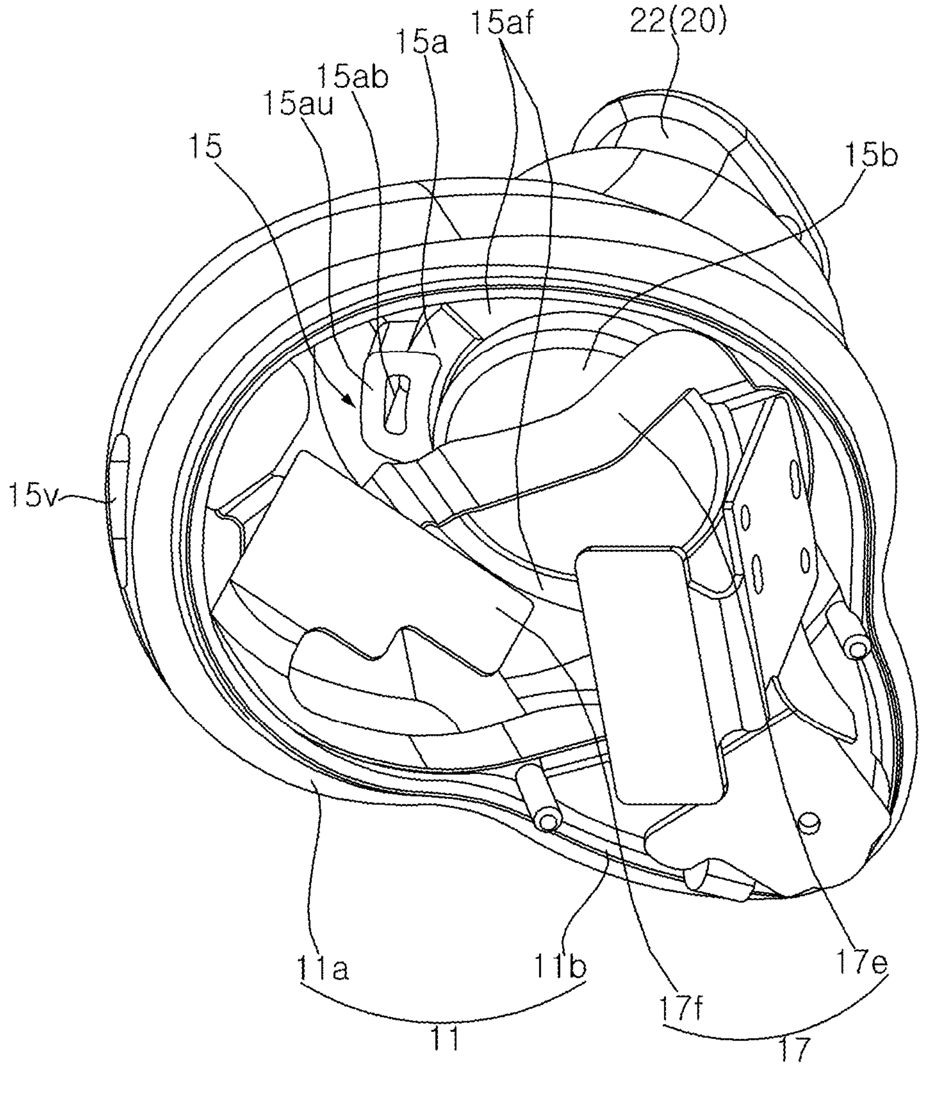
Figure 12:
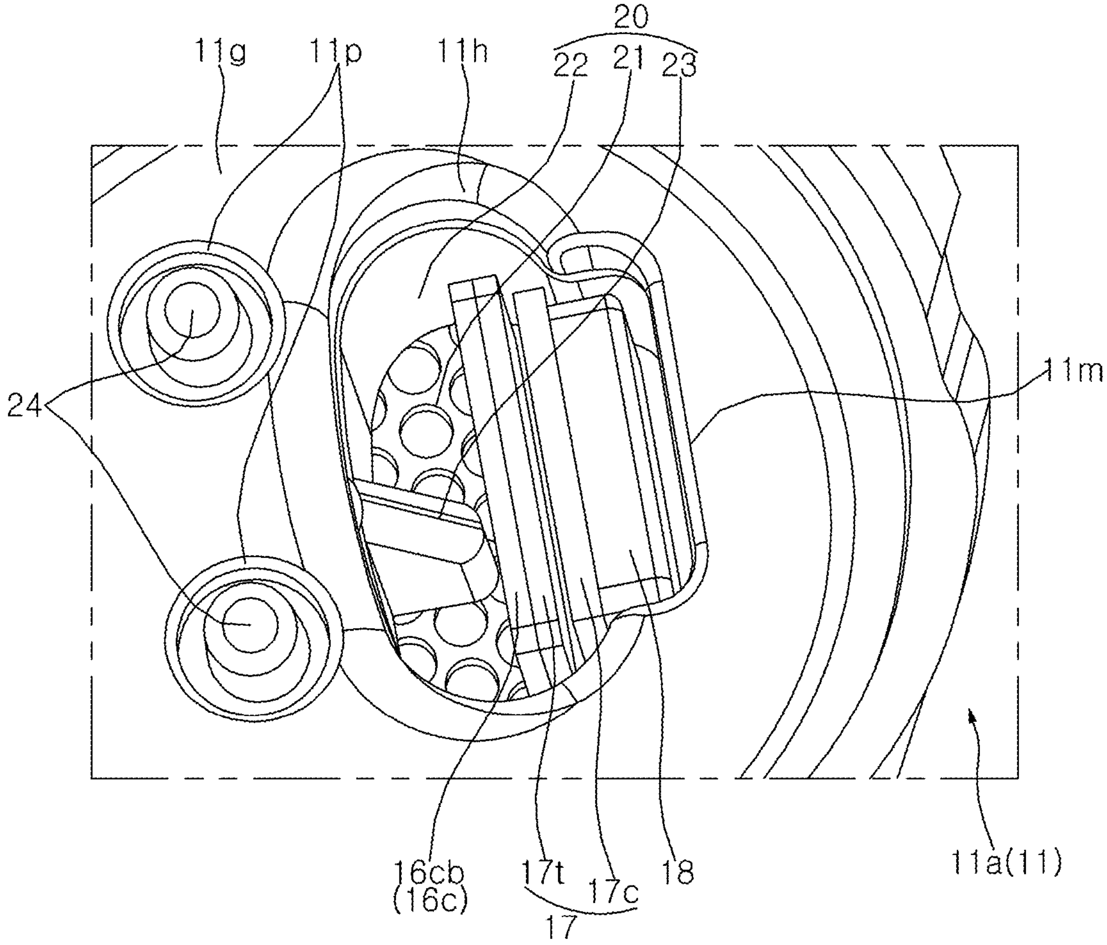

Referring to FIGS. 11 and 12, the transducer 15 and a portion of the modularized circuit board 17 may be located opposite to the nozzle 20 with respect to the transducer 15. The transducer 15 and the modularized mic 18 may be located inside the nozzle 20. The mic 18 may be located in the interior of the nozzle 20 in correspondence with a portion 11*m* of the hole 11*h* of the bottom cover 11. The third part 17*c* of the circuit board 17 may be located between the mic 18 and the support rib 23 of the nozzle 20, and the mic 18 may be mounted on the third part 17*c*. The support portion 16*cb* of the supporter 16*c* may be located between the third part 17*c* and the support ribs 23, and the third part 17*c* may be coupled to the support portion 16*cb* through the adhesive member 17*t*, such as a tape.

The support rib 23 may be opposite to the third part 17*c* of the circuit board 17 with respect to the support portion 16*cb*, and may support one surface of the support portion 16*cb*. The support portion 16*cb* and the mic 18 may be sandwiched between the support rib 23 and the inner surface of the nozzle wall 22. Accordingly, the location of the mic 18 mounted on the third part 17*c* may be fixed.

In addition, the support rib 23 may be inclined toward the nozzle plate 21 at a certain angle (theta i, see FIG. 13) with respect to a plane perpendicular to the nozzle wall 22 of the nozzle 20. The support rib 23 may have an overall trapezoidal shape, and the inclined portion of the support rib 23 may be the hypotenuse of the trapezoid. The width of the support rib 23 may decrease as it moves away from the nozzle plate 21 (i.e., as it approaches the transducer 15). Accordingly, sound provided from the transducer 15 to the nozzle 20 can be minimized from being resisted by the support rib 23.

Figure 13:
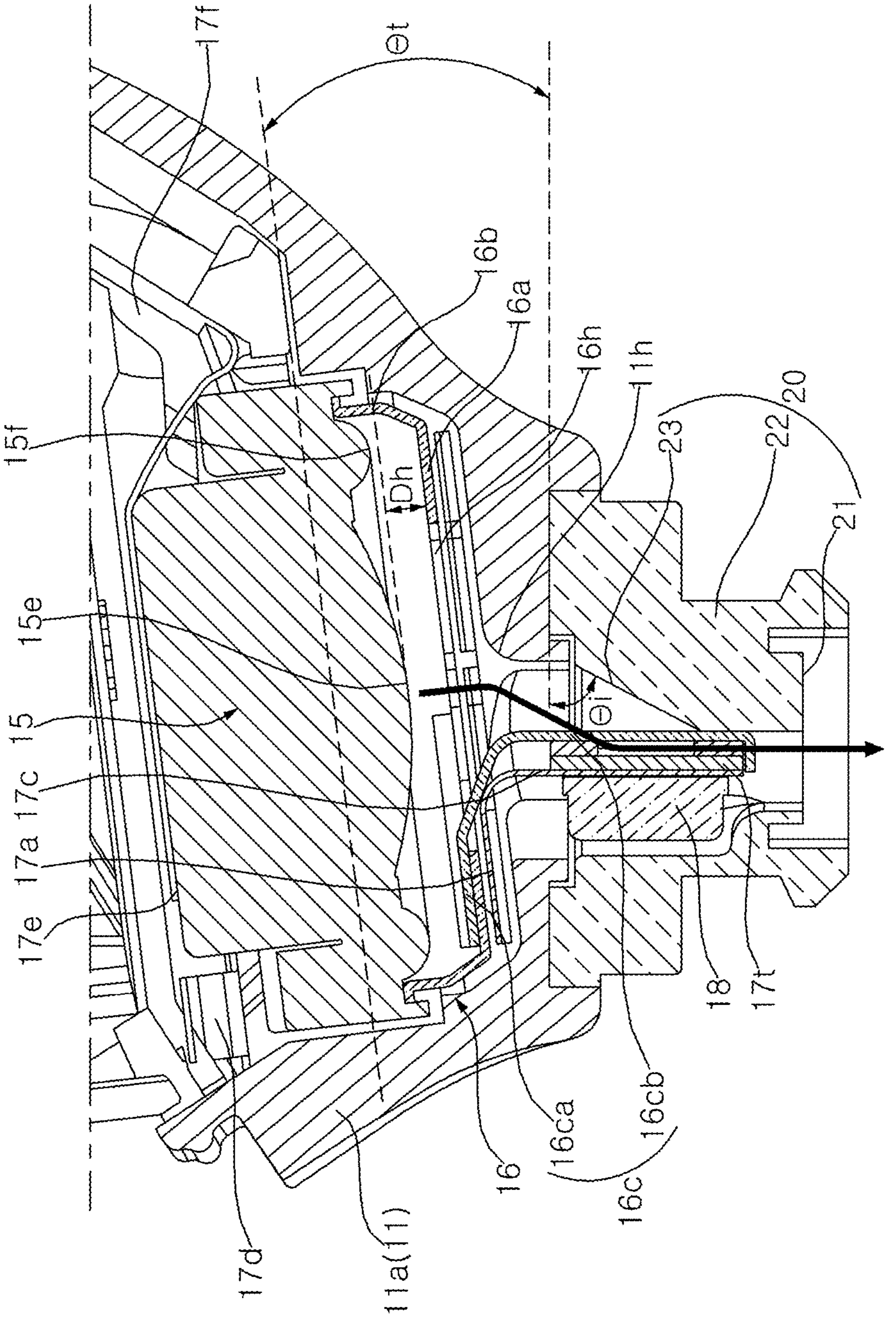

Referring to FIG. 13, the transducer 15 may be inclined at a certain angle theta t with respect to a plane perpendicular to the nozzle 20. For example, the angle (theta t) may be approximately 6.9 degrees. The sound of the transducer 15 reproduced according to the vibration of the diaphragm 15*e* may be output to the outside through a space Dh between the transducer 15 and the bottom plate 16*a* of the holder 16, the hole 16*h* of the bottom plate 16*a*, the housing hole 11*h* of the bottom cover 11, and the nozzle 20.

At this time, since the structure of the bottom plate 16*a* of the holder 16 facing the transducer 15 is simple, reflection or diffraction of the sound of the transducer 15 by the holder 16 may be minimized. That is, the sound quality of the sound (e.g., sound in a high frequency band) may be improved, and the variation in sound quality may be minimized.

In addition, the diameter (width) of the side wall 16*b* of the holder 16 may become smaller as it moves away from the transducer 15. For example, the diameter of a first portion (no reference numeral) of the sidewall 16*b* may be maintained uniformly, and the diameter of a second portion (no reference numeral) of the side wall 16*b* connected to the first portion may become smaller as it moves away from the transducer 15. The sidewall 16*b* and the bottom plate 16*a* of the holder 16 may have a funnel shape as a whole. That is, the sidewall 16*b* and the bottom plate 16*a* of the holder 16 may guide the sound from the transducer 15 into the holes 16*h* of the bottom plate 16*a*, which may improve the sound quality of the sound.

Referring again to FIG. 3, a top hole 12*n* may be formed to penetrate the top cover 12. The substrate 14 may be located in the second space 10S2, and may be coupled to the inner surface of the top cover 12. The substrate 14 may be a printed circuit board PCB. A channel 12*np* may protrude from the substrate 14 toward the inner surface of the top cover 12, and an internal flow path of the channel 12*np* may communicate with the top hole 12*n*. Air (or sound waves) may flow into a noise recognition microphone (not shown) of the substrate 14 through the internal flow path of the top hole 12*n* and the channel 12*np*. The noise recognition microphone of the substrate 14 may recognize noise. The top hole 12*n* may be referred to as a noise inflow hole 12*n*. The noise recognition microphone of the substrate 14 may be electrically connected to the transducer 15 through the circuit board 17 (see FIG. 4). The transducer 15 may reproduce a sound that has an anti-phase with respect to the noise acquired from the noise recognition microphone of the substrate 14, and may have a wavelength that cancels out the noise.

A bottom hole 11*v* may be formed to penetrate the first part 11*a* of the bottom cover 11. The bottom hole 11*v* may be adjacent to the boundary between the first part 11*a* of the bottom cover 11 and the top cover 12. The first space 10S1 may include a back room BR between the bottom hole 11*v* and the transducer 15, and a front room FR between the transducer 15 and the nozzle 20. Air (or sound waves) may flow into the mic 18 inside the nozzle 20 through the bottom hole 11*v*, the back room BR, the transducer 15, and the front room FR (see bold arrow in FIG. 3). The mic 18 inside the nozzle 20 may recognize noise. The bottom hole 11*v* may be referred to as a vent hole 11*v*. The mic 18 inside the nozzle 20 may be electrically connected to the transducer 15 through the circuit board 17 (see FIG. 4). The transducer 15 may reproduce a sound having an anti-phase with respect to the noise acquired by the mic 18 inside the nozzle 20, and may have a wavelength that cancels out the noise.

At this time, the mic 18 may detect whether the transducer 15 reproduces a sound having an anti-phase with respect to the noise flowing into the top hole 12*n*, and provide feedback to the transducer 15. The mic 18 may be referred to as a feedback mic 18.

In addition, the pressure in the internal auditory canal of a user wearing the sound device 1 on the ear may be relieved through the nozzle 20, the first space 10S1, and the bottom hole 11*v*.

Figure 14:
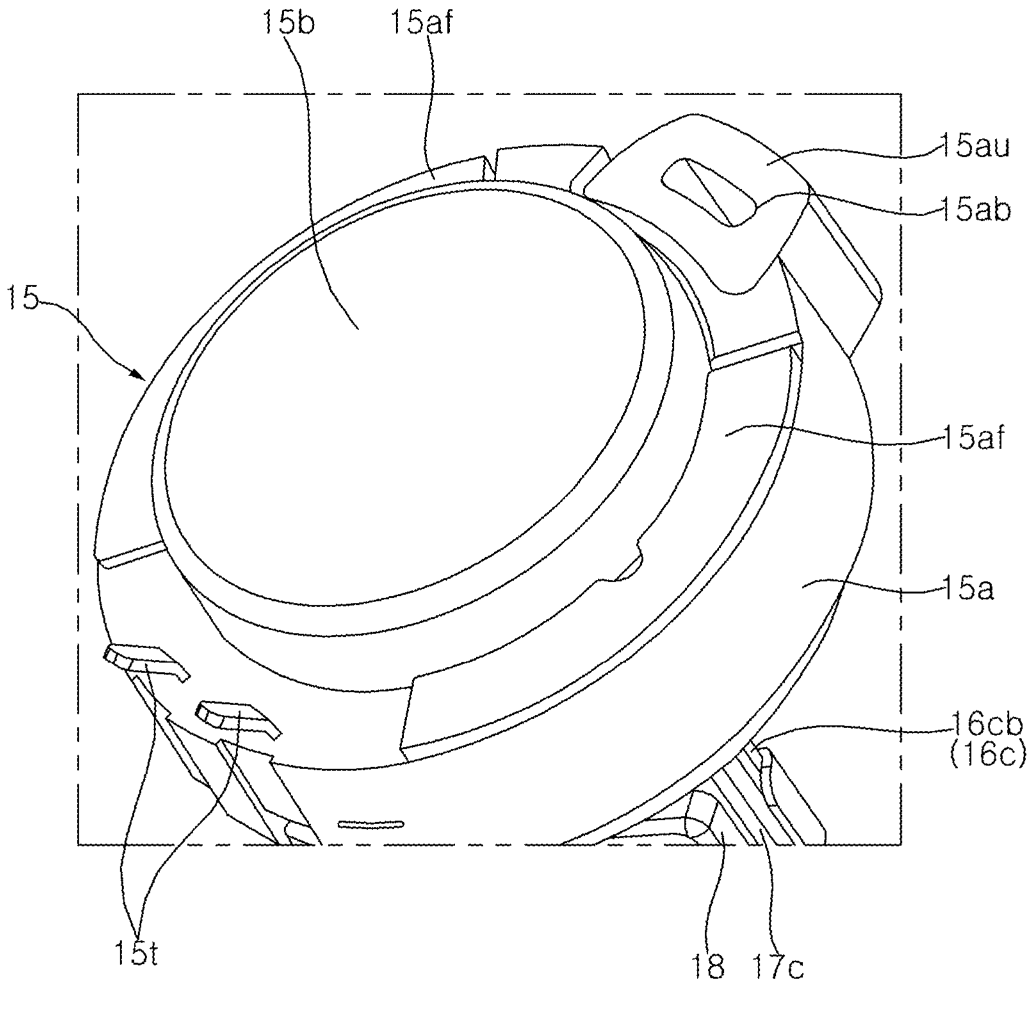
Figure 15:
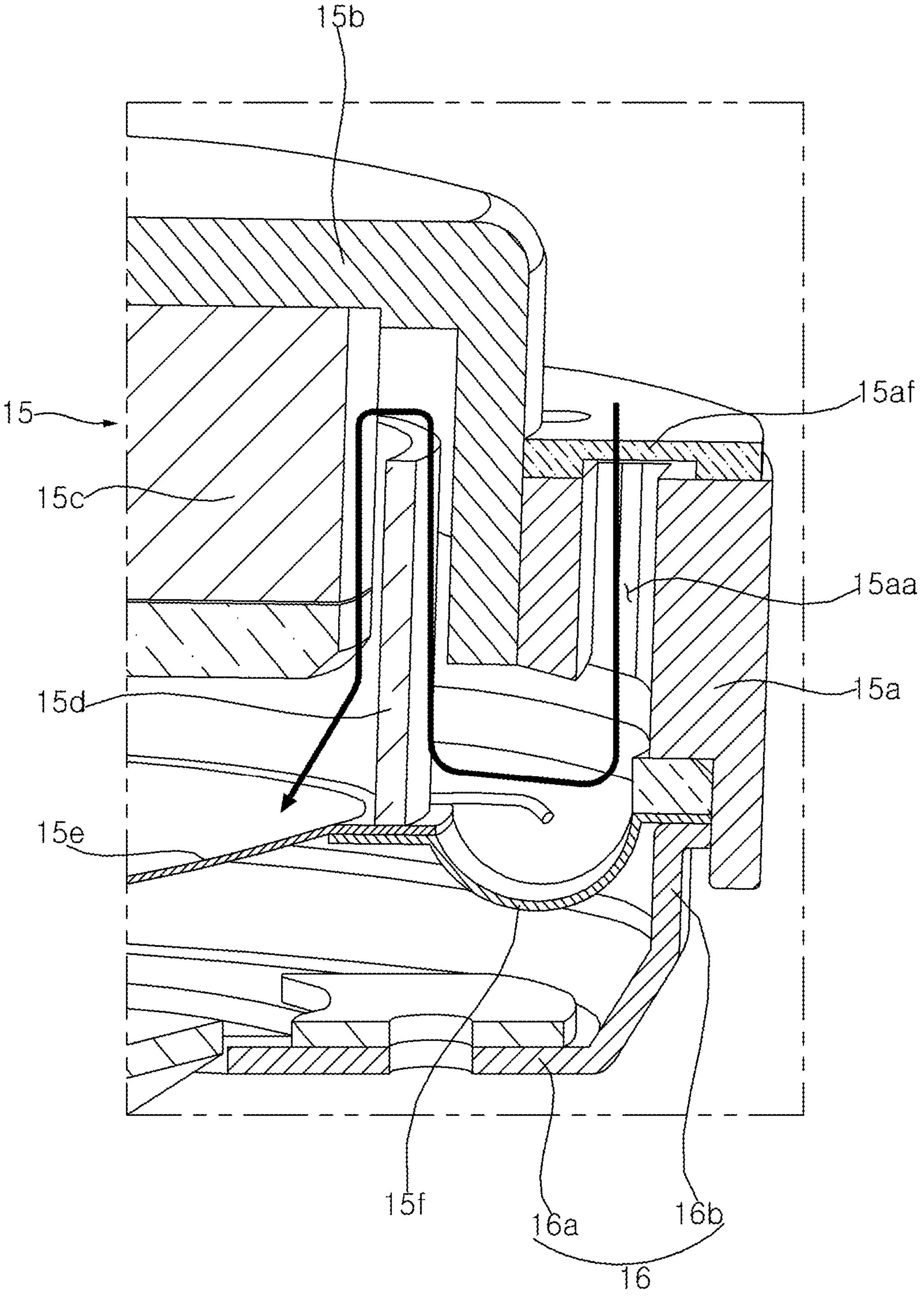

Referring to FIGS. 14 and 15, a damper 15*af* may extend in an arc shape along the frame 15*a* of the transducer 15, and may be coupled or attached to the frame 15*a*. The damper 15*af* may face the seating portion 13*a* (see FIG. 3) of the inner bracket 13. The dampers 15*af* may support vibration of the transducer 15, and may include a material that allows air to pass through, such as a non-woven fabric. For example, a plurality of dampers 15*af* may be spaced apart from each other in a circumferential direction of the frame 15*a*.

A frame hole 15*aa* may be formed to penetrate the frame 15*a*, and communicate with the pores of the damper 15*af*. For example, a plurality of frame holes 15*aa* may be spaced apart from each other in the circumferential direction of the frame 15*a*, and may correspond to a plurality of dampers 15*af*.

Air (or sound waves, see FIG. 3) that passed through the bottom hole 11*v* and the back room BR may flow into between the frame 15*a* and the edge 15*f* via the damper 15*af* and the frame hole 15*aa*, and may flow into between the magnet 15*c* and the diaphragm 15*e* through a gap around the bobbin 15*d* (see bold arrow in FIG. 15). The air flowed into between the magnet 15*c* and the diaphragm 15*e* may allow the diaphragm 15*e* to vibrate, and noise corresponding to such a vibration may be input to the mic 18 (see FIG. 3) inside the nozzle 20.

Accordingly, the mic 18 inside the nozzle 20 may recognize the noise flowing into the bottom hole 11*v*, and the transducer 15 may play sound having an anti-phase with respect to the noise.

Figure 16:
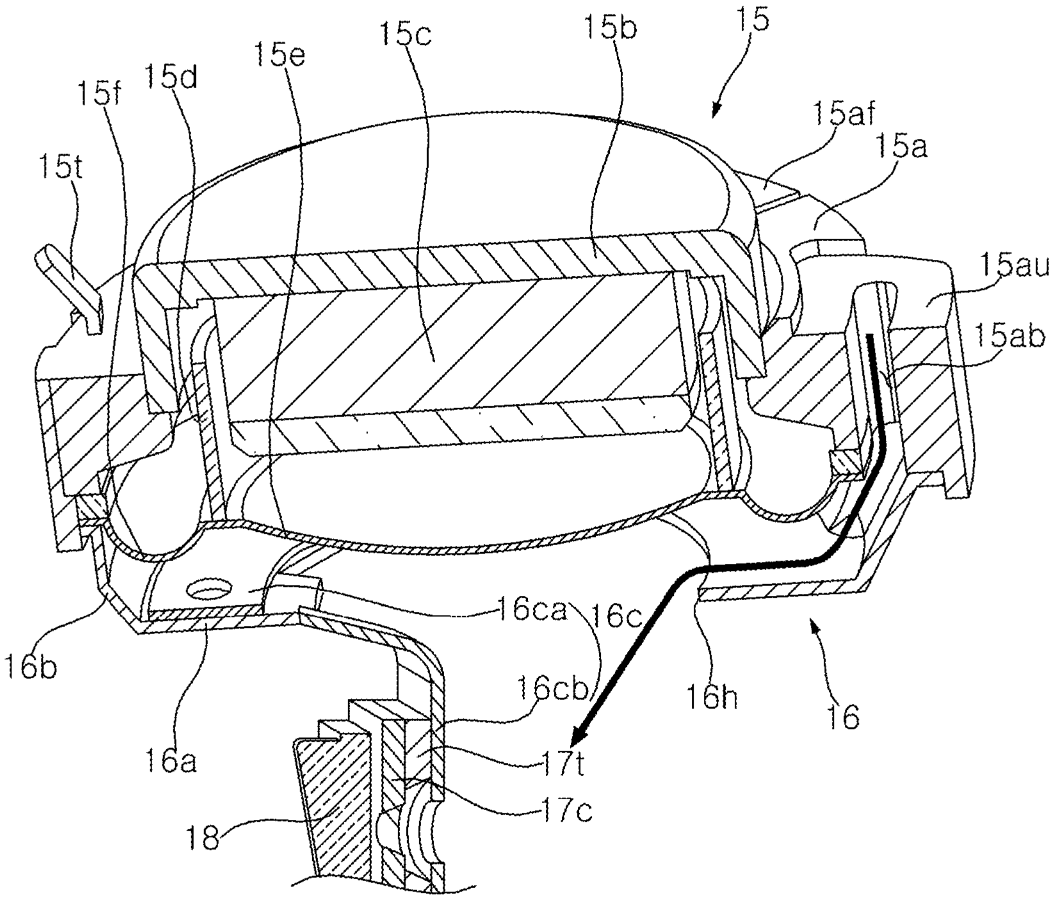

Referring to FIG. 16, the guide hole 15*ab* may be formed by penetrating the guide protrusion 15*au*. The guide hole 15*ab* may communicate with a space between the transducer 15 and the holder 16.

Air (or sound waves, see FIG. 3) that passed through the bottom hole 11*v* and the back room BR may flow into between the edge 15*f* and the bottom plate 16*a* of the holder 16 via the guide hole 15*ab*, and may flow into the mic 18 through the hole 16*h* of the bottom plate 16*a* (see thick arrow in FIG. 16).

Accordingly, the mic 18 may recognize the noise flowing into the bottom hole 11*v*, and the transducer 15 may reproduce a sound having an anti-phase with respect to the noise.

Referring to FIGS. 1 to 16, a sound device according to one aspect of the present disclosure may include: a transducer including a diaphragm; a nozzle spaced apart from the diaphragm; a holder positioned between the diaphragm and the nozzle, and coupled to the transducer; and a microphone coupled to the holder, and positioned inside the nozzle, wherein the holder may include: a bottom plate facing the diaphragm, and spaced apart from the diaphragm, the bottom plate having a hole facing the diaphragm; and a side wall extending along a rim of the bottom plate, and coupled to the transducer.

The hole of the bottom plate may be positioned between the diaphragm and an inner space of the nozzle, and a space between the diaphragm and the bottom plate may communicate with the internal space of the nozzle through the hole of the bottom plate.

A width of the side wall may become smaller as it gets closer to the bottom plate.

The holder may have a round tray shape having the hole formed at a bottom.

The holder further includes a supporter protruding from the bottom plate toward the nozzle, and positioned inside the nozzle, and the microphone may be coupled to the supporter.

The sound device may further include a circuit board electrically connected to the microphone, and coupled to the supporter, and the circuit board may surround the holder and the transducer.

The sound device may further include a housing which accommodates the transducer and the holder, and to which the nozzle is coupled, and the housing includes a housing hole which is formed at the housing, and which communicates with the hole of the bottom plate and an interior of the nozzle.

The nozzle may include: a nozzle plate which forms a distal end of the nozzle, and at which a plurality of holes are formed; a nozzle wall extending along a rim of the nozzle plate, and coupled to the housing; and a support rib protruding from an inner surface of the nozzle wall toward a part of the holder to which the microphone is coupled, and supporting the part of the holder.

The support rib may be inclined towards the nozzle plate with respect to a plane perpendicular to the nozzle wall.

The housing may include a recessed portion which is formed at an inner surface of the housing, on which the bottom plate is seated, and at which the housing hole is formed.

The housing may include a vent hole which is formed to penetrate the housing and which communicates with an interior of the housing, and air passed through the vent hole may flow into the microphone inside the nozzle through the transducer, the hole of the bottom plate, and the housing hole of the housing.

The transducer may play sound having an anti-phase with respect to noise recognized by the microphone.

The transducer may include: a frame to which the diaphragm is vibratably coupled; a frame hole formed to penetrate the frame; and a damper coupled to the frame, and having pores communicating with the frame hole, and the air passed through the vent hole passes through the damper and the frame hole, and vibrates the diaphragm.

The transducer may include: a frame to which the diaphragm is vibratably coupled; and a guide hole formed to penetrate the frame, wherein the air passed through the vent hole may flow into the microphone inside the nozzle through the guide hole, the hole of the bottom plate, and the housing hole of the housing.

The sound device may further include: an inner bracket which divides an internal space of the housing into a first space in which the transducer is positioned and a second space; and a substrate which is positioned in the second space, and on which a noise recognition microphone is mounted. The housing may include a noise inflow hole which is formed to penetrate the housing and communicates with the noise recognition microphone, and the transducer may play a sound having an anti-phase with respect to a noise obtained by the noise recognition microphone, wherein the microphone inside the nozzle may be a feedback microphone.

The sound device may further include a rechargeable battery located in the second space.

The sound device according to the present disclosure has the following effects.

According to at least one of the embodiments of the present disclosure, a sound device having improved acoustic performance may be provided.

According to at least one of the embodiments of the present disclosure, a sound device having minimal variation in sound quality may be provided.

According to at least one of the embodiments of the present disclosure, a sound device having improved sound quality in a high frequency band may be provided.

According to at least one of the embodiments of the present disclosure, a sound device equipped with an active noise cancellation function may be provided.

According to at least one of the embodiments of the present disclosure, a sound device having a simplified noise inflow path (or air duct path) structure may be provided.

According to at least one of the embodiments of the present disclosure, a sound device having improved assembly convenience and minimized process defects may be provided.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A sound device comprising:
a transducer including a diaphragm;
a nozzle spaced apart from the diaphragm;
a holder disposed between the diaphragm and the nozzle, the holder being coupled to the transducer; and
a microphone coupled to the holder, the microphone being disposed inside the nozzle,
wherein the holder comprises:
a bottom plate including a rim and a hole, the bottom plate facing the diaphragm with a space being provided between the diaphragm and the bottom plate;
a side wall extending from the rim of the bottom plate, the side wall being coupled to the transducer; and
a supporter protruding from the bottom plate toward the nozzle,
wherein the nozzle comprises:
a nozzle wall surrounding a side surface of the microphone; and
a support rib protruding from an inner surface of the nozzle wall,
wherein the supporter comprises:
a first surface facing the microphone and to which the microphone is coupled; and
a second surface opposite the first surface, the second surface contacting the support rib, and
wherein the microphone is located between the support rib and an inner surface of the nozzle wall, and contacts the inner surface of the nozzle wall.

2. The sound device of claim 1, wherein the hole of the bottom plate is disposed between the diaphragm and an inner space of the nozzle, and
wherein the space between the diaphragm and the bottom plate communicates with an internal space of the nozzle through the hole of the bottom plate.

3. The sound device of claim 1, wherein a width of the side wall extending from the rim of the bottom plate becomes smaller proceeding toward the bottom plate.

4. The sound device of claim 1, wherein the holder further comprises a round tray shape, and
wherein the round tray shape includes the hole provided in the bottom plate.

5. The sound device of claim 1, further comprising a circuit board electrically connected to the microphone,
wherein the circuit board is coupled to the supporter, and
wherein the circuit board surrounds both the holder and the transducer.

6. The sound device of claim 1, further comprising a housing including a housing hole, wherein the housing accommodates the transducer and the holder, wherein the housing is coupled to the nozzle, and wherein the housing hole communicates with the hole of the bottom plate and an internal space of the nozzle.

7. The sound device of claim 6, wherein the nozzle further comprises a nozzle plate forming a distal end of the nozzle and including a plurality of holes, and wherein the nozzle wall extends along a rim of the nozzle plate and is coupled to the housing.

8. The sound device of claim 7, wherein the support rib is inclined towards the nozzle plate.

9. The sound device of claim 6, wherein the housing further comprises a recessed portion, wherein the recessed portion is provided on the bottom plate of an inner surface of the housing, and wherein the recessed portion includes the housing hole.

10. The sound device of claim 6, wherein the housing further comprises a vent hole, wherein the vent hole penetrates the housing and communicates with an interior of the housing, and wherein air passes through the vent hole and flows into the microphone inside the nozzle through the transducer, the hole of the bottom plate, and the housing hole of the housing.

11. The sound device of claim 10, wherein the transducer is configured to play a sound having an anti-phase with respect to noise detected by the microphone.

12. The sound device of claim 10, wherein the transducer comprises:

a frame to which the diaphragm is coupled;

a frame hole provided in the frame; and a damper coupled to the frame, wherein the damper includes pores communicating with the frame hole, wherein the air passes through the vent hole, and passes through the damper and the frame hole, and wherein the air that passes through the damper and the frame hole causes the diaphragm to vibrate.

13. The sound device of claim 10, wherein the transducer comprises:

a frame to which the diaphragm is coupled; and a guide hole provided in the frame, and wherein the air passes through the vent hole, and then flows into the microphone inside the nozzle through the guide hole, the hole of the bottom plate, and the housing hole of the housing.

14. The sound device of claim 6, further comprising:

an inner bracket configured to divide an internal space of the housing into a first space including the transducer and a second space; and a substrate disposed in the second space, wherein a noise recognition microphone is mounted on the substrate, wherein the housing further comprises a noise inflow hole provided in the housing and in communication with the noise recognition microphone, wherein the transducer is configured to play a sound having an anti-phase with respect to a noise detected by the noise recognition microphone, and wherein the microphone inside the nozzle is a feedback microphone.

* * * * *